US008271522B2

(12) United States Patent  
Mehul et al.

(10) Patent No.: US 8,271,522 B2
(45) Date of Patent: Sep. 18, 2012

(54) MATCHING QUERIES IN A NETWORK

(75) Inventors: Motani Mehul, Singapore (SG);
Srinivasan Vikram, Singapore (SG)

(73) Assignee: National University of Singapore, Singapore (SG)

( * ) Notice: Subject to any disclaimer, the term of this patent is extended or adjusted under 35 U.S.C. 154(b) by 380 days.

(21) Appl. No.: 11/720,808

(22) PCT Filed: Dec. 3, 2004

(86) PCT No.: PCT/SG2004/000396
§ 371 (c)(1),
(2), (4) Date: Sep. 2, 2009

(87) PCT Pub. No.: WO2006/059954
PCT Pub. Date: Jun. 8, 2006

(65) Prior Publication Data
US 2009/0319503 A1 Dec. 24, 2009

(51) Int. Cl.
*G06F 17/30* (2006.01)

(52) U.S. Cl. . 707/770; 707/771; 707/959; 707/E17.032; 709/218

(58) Field of Classification Search .......... 709/201, 709/238, 218; 707/999.005, 999.007, 770, 707/771, E17.032, 959
See application file for complete search history.

(56) References Cited

U.S. PATENT DOCUMENTS

| 5,623,495 | A | | 4/1997 | Eng et al. |
| 5,694,593 | A | * | 12/1997 | Baclawski ............................. 1/1 |
| 5,822,696 | A | * | 10/1998 | Bergkvist ...................... 455/436 |
| 6,336,138 | B1 | * | 1/2002 | Caswell et al. ............... 709/223 |
| 6,463,433 | B1 | * | 10/2002 | Baclawski ............................. 1/1 |
| 6,490,274 | B1 | | 12/2002 | Kim |
| 6,529,504 | B1 | | 3/2003 | Sbisa |
| 6,549,768 | B1 | * | 4/2003 | Fraccaroli ................. 455/456.3 |
| 6,603,851 | B1 | | 8/2003 | Smith et al. |
| 6,614,774 | B1 | * | 9/2003 | Wang ............................ 370/338 |
| 6,628,773 | B1 | * | 9/2003 | Lautenschlager et al. ....................... 379/220.01 |
| 6,826,385 | B2 | * | 11/2004 | Kujala ......................... 455/13.1 |
| 6,826,607 | B1 | * | 11/2004 | Gelvin et al. ................ 709/224 |
| 7,069,319 | B2 | * | 6/2006 | Zellner et al. ................ 709/224 |

(Continued)

FOREIGN PATENT DOCUMENTS

JP 2001-308892 A2 11/2001

(Continued)

OTHER PUBLICATIONS

Hoschek, W., "Dynamic Timeouts and Neighbor Selection Queries in Peer-to-Peer Networks", 2002, 7 pages.*

(Continued)

*Primary Examiner* — Phuong Thao Cao
(74) *Attorney, Agent, or Firm* — Schwabe, Williamson & Wyatt, P.C.

(57) ABSTRACT

A method of matching queries in a hybrid infrastructure/infrastructure-less network, the network comprising pluralities of first and second type communication devices respectively, the method comprising placing a first query by a user on one of the first type devices and forwarding the query via infrastructure based communication to one of the second type devices; forwarding, depending on a category of the first query, the first query from the one second type device to one or more first type devices via infrastructure based communication; and relaying the first query from each of one or more first type devices to one or more neighboring first type devices via infrastructure-less communication.

24 Claims, 6 Drawing Sheets

U.S. PATENT DOCUMENTS

| | | | |
|---|---|---|---|
| 7,158,801 B1 * | 1/2007 | Muhonen | 455/503 |
| 7,181,444 B2 * | 2/2007 | Porter et al. | 1/1 |
| 7,200,673 B1 * | 4/2007 | Augart | 709/238 |
| 7,243,091 B2 * | 7/2007 | Kalogeraki et al. | 707/758 |
| 7,263,560 B2 * | 8/2007 | Abdelaziz et al. | 709/238 |
| 7,406,071 B1 * | 7/2008 | Tang et al. | 370/352 |
| 7,464,155 B2 * | 12/2008 | Mousavi et al. | 709/224 |
| 7,509,372 B2 * | 3/2009 | Dutta et al. | 709/203 |
| 7,599,922 B1 * | 10/2009 | Chen et al. | 1/1 |
| 7,720,993 B2 * | 5/2010 | Liu et al. | 709/238 |
| 7,743,044 B1 * | 6/2010 | Kalogeraki et al. | 707/706 |
| 2002/0111956 A1 * | 8/2002 | Yeo et al. | 707/200 |
| 2002/0133494 A1 * | 9/2002 | Goedken | 707/10 |
| 2002/0152262 A1 * | 10/2002 | Arkin et al. | 709/202 |
| 2002/0174110 A1 | 11/2002 | Smith | |
| 2002/0184357 A1 * | 12/2002 | Traversat et al. | 709/223 |
| 2002/0198862 A1 * | 12/2002 | Bellmann | 707/1 |
| 2003/0014391 A1 * | 1/2003 | Evans et al. | 707/1 |
| 2003/0037167 A1 * | 2/2003 | Garcia-Luna-Aceves et al. | 709/238 |
| 2003/0063771 A1 * | 4/2003 | Morris et al. | 382/100 |
| 2003/0191828 A1 * | 10/2003 | Ramanathan et al. | 709/221 |
| 2004/0019657 A1 * | 1/2004 | Akiyama | 709/217 |
| 2004/0024877 A1 * | 2/2004 | Celle | 709/226 |
| 2004/0044727 A1 * | 3/2004 | Abdelaziz et al. | 709/203 |
| 2004/0044790 A1 * | 3/2004 | Loach et al. | 709/241 |
| 2004/0059722 A1 * | 3/2004 | Yeh et al. | 707/3 |
| 2004/0098377 A1 * | 5/2004 | Kraft | 707/3 |
| 2004/0117794 A1 * | 6/2004 | Kundu | 718/102 |
| 2004/0162871 A1 * | 8/2004 | Pabla et al. | 709/201 |
| 2004/0215709 A1 * | 10/2004 | Basani et al. | 709/201 |
| 2005/0108368 A1 * | 5/2005 | Mohan et al. | 709/220 |
| 2005/0197107 A1 * | 9/2005 | Hasan et al. | 455/414.1 |
| 2005/0283497 A1 * | 12/2005 | Nurminen et al. | 707/104.1 |
| 2005/0289339 A1 * | 12/2005 | Walker | 713/153 |
| 2006/0002320 A1 * | 1/2006 | Costa-Requena et al. | 370/312 |
| 2006/0069664 A1 * | 3/2006 | Ling et al. | 707/1 |
| 2006/0142020 A1 * | 6/2006 | Mueckenheim et al. | 455/453 |
| 2006/0168318 A1 * | 7/2006 | Twiss | 709/238 |

FOREIGN PATENT DOCUMENTS

| | | |
|---|---|---|
| JP | 2002-198892 A2 | 7/2002 |
| JP | 2004088657 | 3/2004 |
| JP | 2004-172992 A2 | 6/2004 |
| WO | WO 01/99024 * | 12/2001 |
| WO | 2003/032501 A2 | 4/2003 |

OTHER PUBLICATIONS

Klemm, et al., "A Special-Purpose Peer-to-Peer File Sharing System for Mobile Ad Hoc Networks", IEEE 2003, pp. 2758-2763.*

Butt et al., "On the Equivalence of Forward and Reverse Query Caching in Peer-to-Peer Overlay Networks", In the Proceedings of the 9th International Workshop on Web Content Caching and Distribution (WCW'04), Beijing, China, Oct. 18-29, 2004, 12 pages, accessed online at <https://engineering.purdue.edu/~ychu/publications/wcw04.pdf> on Feb. 22, 2012.*

Shen et al., "An MDP-Based Peer-to-Peer Search Server Network", In the Proceedings of the 3rd International Conference on Web Information Systems Engineering (WISE'02), IEEE, 2002, 10 pages, accessed online at <http://ieeexplore.ieee.org/stamp/stamp.jsp?tp=&arnumber=1181663> on Feb. 22, 2012.*

Office Action issued Jun. 2, 2010 from Chinese Patent Application No. 200480044809.9.

Barkai, D., "Peer-To-Peer Computing: Technologies for Sharing and Collaborating on the Net," Intel Press, 2002.

El Gamal, A., Mammen, J., Prabhakar, B. and Shah, D., "Throughput Delay Trade-off in Wireless Networks", In Proc. Infocom 2004.

Grossglauser, M. and Tse, D., "Mobility Increases the Capacity of Adhoc Wireless Networks", IEEE/ACM Transactions on Networking, vol. 10, No. 4, Aug. 4, 2002, pp. 477-486.

Luo, H., Ramjee, R., Sinha, P., Li, Li, and Lu, S., "UCAN: A Unified Cellular and Ad-Hoc Network Architecture", In Proc. ACM Mobicom, Sep. 14-19, 2003.

Neely, M.J. and Modiano, E., "Capacity and Delay Tradeoffs for Ad Hoc Mobile Networks", IEEE Transactions on Information Theory, vol. 51, No. 6, pp. 1917-1937, Jun. 2005, found at http://www-rcf.usc.edu/mjneely.

Papadopouli, M., et al. "Effects of Power Conservation, Wireless Coverage and Cooperation on Data Dissemination among Mobile Devices", International Symposium on Mobile Ad Hoc Networking & Computing (MobiHoc), Proceedings on the 2nd ACM International Symposium on Mobile Ad Hoc Networking & Computing 2001, Oct. 4-5, 2001, Long Beach, California, USA, pp. 117-127, ISBN: 1-58113-428-2.

Shakkottai, S., "Asymptotics of Query Strategies over a Sensor Network" Proceedings of IEEE Infocom, Hong Kong, Feb. 11, 2004.

Small, T. and Haas, Z., "The Shared Wireless Infostation Model—A New Ad Hoc Networking Paradigm (or Where there is a Whale, there is a Way)," In Proc. ACM MobiHoc, Jun. 1-3, 2003.

Stoica, I., Morris, R., Karger, D., Kaashoek, M. F., and Balakrishnan, H., "Chord: A Scalable Peer-to peer Lookup Service for Internet Applications." In Proc. ACM SIGCOMM, Aug. 27-31, 2001.

Yang, B. and Garcia-Molina, H., "Efficient Search in Peer-to-peer Networks." In Proc. ICDCS, 2002.

Office Action issued Aug. 26, 2010 from Japanese Patent Application No. 2007-544308.

Office Action for Korean Patent Application 10-2007-7015308, issued on Feb. 21, 2011, 8 pages.

Supplementary Search Report for European Application 04801748, mailed Nov. 9, 2010, 4 pages.

Office Action for Japanese Application 2007-544308, mailed Jan. 18, 2011, 2 pages.

Notice of Allowance for Chinese Application 200480044809.9, mailed Nov. 15, 2010, 2 pages.

Xu B et al: "Data Management in Mobile Peer-to-Peer Networks" Aug. 30, 2004, Department of Computer Science, University of Illinois at Chicago, 15 pages.

Search and Examination Report for Singapore Patent Application No. 200907830-4, mailed on Dec. 16, 2011.

* cited by examiner

MATCHING QUERIES IN A NETWORK

CROSS-REFERENCE TO RELATED APPLICATION

The present application is a national phase entry under 35 U.S.C. §371 of International Patent Application No. PCT/SG2004/000396, filed Dec. 3, 2004, which designates the United States of America, the entire content and disclosure of which is hereby incorporated by reference in its entirety for all purposes except for those sections, if any, that are inconsistent with the present application.

FIELD OF INVENTION

The present invention relates broadly to a method and system for matching queries in a network, and to a computer readable data storage medium having stored thereon computer code means for instructing a computer to execute a method for matching queries in a network.

BACKGROUND

Often, people seek information by asking their social contacts and by navigating their social network. This way of seeking information is still very popular in spite of the availability of vast repositories of information such as the world wide web, libraries etc. This is because people may possess unique information (e.g., location specific, or temporal), which is not easily available from other information repositories such as the Internet.

Wireless technology has made tremendous advances and there now exist a variety of access technologies for different needs. For example, cellular networks provide ubiquitous voice communications and some limited data services. Wireless LAN standards such as IEEE 802.11 have enabled untethered, high speed access to the Internet. In addition, Bluetooth™ has emerged as a cable replacement technology for providing low rate services between different kinds of devices.

Recently, there has been a convergence in devices, meaning that all these different technologies are available on a single device. For example, there are several cell phones on the market which are capable of Bluetooth™ communications. Recently HP™ announced a device which has cellular, Bluetooth® and WLAN capabilities. There has been some research on exploiting this convergence to provide better data and voice services. For example, an architecture which uses multi-hop communications to relay data to a cellular base station has been proposed. The rationale being that, reduced power used for multi-hop transmissions will result in improved spatial reuse and thereby provide better capacity in the network. Most research in ad hoc networks however adheres to the traditional point to point communication paradigm whereby the goal is to provide reliable end to end delivery of packets between a source and a destination (or multiple destinations in the case of multicast). The research has focussed on importing this traditional communication paradigm into the world of peer-to-peer wireless networks (or ad hoc networks).

There has been intense research effort in designing efficient routing and transport protocols that will enable traditional communication networks applications such as file transfer, voice and streaming applications. However, in a social network, people navigate or query for information by directly asking their friends or people in their vicinity. These social contacts then either provide an answer or direct the query to people whom they believe know the answer. In other words, there is no end-to-end notion of a communication session. Another proposed system involves peer-to-peer (P2P) networks in the wired/wireless world. In current P2P networks, the requestor sends a query which is propagated through a specific community (say Napster™) and if a match is found, the response is routed back to the requestor and a match is made. If, however, the requester is unavailable or has temporarily disconnected, the match is lost. If desired, the requestor must re-initiate the search.

7DS [M. Papadopouli and H. Schulzrinne, "Effects of power conservation, wireless coverage and cooperation on data dissemination among mobile devices", ACM SIGMOBILE Symposium on Mobile Ad Hoc Networking & Computing (MobiHoc) 2001, Oct. 4-5, 2001, Long Beach, Calif.] is a peer-to-peer resource sharing system, aimed at providing data access to wireless mobile devices. As an example, consider a network of hosts which can communicate over a wireless local area network. Some of these hosts are able to access the internet via a wireless mode, an access point, or Bluetooth™. Consider host A who is participating in an internet access session but has intermittent connectivity to the internet. When A needs access but is not connected, it queries hosts in its proximity for the data. Suppose, hosts B and C receive the query. If they have the data, they can forward it to A. If they do not have the data, but they have internet access, they can obtain the data and then forward it to A. The emphasis of 7DS is data access provision for wireless mobile users who have intermittent connectivity. 7DS has its primary goal providing data connectivity to mobile hosts. In other words 7DS provides access to existing electronic resources.

The infostation concept, originally proposed by researchers at WINLAB [Do we have a non-web reference to WINLAB?], is based on the idea of using high power base stations (i.e., infestations) to provide high data rate network access to small geographically disjoint areas. The intuition is that users buffer large data until they are in the vicinity of an infostation, thereby incurring a delay. This leads to a natural delay-capacity tradeoff. The SWIM concept extends the infostation idea further by allowing data to travel towards the infostation by hopping through an intermediate mobile ad-hoc network.

SWIM incorporates the idea of propagating data throughout a network of mobile wireless devices. The main aim of SWIM (as with 7DS) is network access, meaning that devices generate data to be offloaded to the wired network through an infostation.

Dodgeball.com and Bedd.com are two examples of services which exploit the recent paradigm of social networking via mobile devices. They follow a number of companies, such as friendster.com and orkut.com, which enable virtual social networking through the internet. Like friendster.com and orkut.com, the Dodgeball.com service allows users to register a list of buddies. Now whenever the user is in a particular place, say a pub or nightclub, he uses his mobile phone to inform Dodgeball.com, who then informs the users' buddies within a ten block radius and also informs the user if his buddies are in the area. The Bedd service allows users with Bluetooth® enabled phones to enter profiles into their phone and search profiles on strangers mobile phones. If there is a match in profiles, the users are alerted. These profiles can contain application specific information, such as for dating or buying and selling products. However, since the queries propagate only through the mobile ad-hoc network, it is not possible to engineer the system to offer sharp service guarantees.

Querying for information over a wireless sensor network has also been investigated. The network consists of a regular grid of sensors in a unit area, in which each sensor can communicate only with adjacent neighbors. In addition, the nodes do not have directional information either about their neighbors or any other nodes. The problem considered is one in which a querying node transmits a query for some information from an unknown destination node. The basic tool in this work is that of random walks and more specifically the continuous time random walk (or Brownian motion). It considers several search strategies. In the first type, the source transmits a query, which does a random walk until it hits the destination. In the second type, both the source and destination transmit a query, and both do random walks until their paths intersect. In the third type, the destination periodically caches the information and the source simply does a random walk until it hits one of the caches. The analysis in that proposal relies heavily on results from random walks and intersections of random walks. The assumption of continuous random walks may not be valid in real-world scenarios.

It is with the knowledge of the above mentioned systems and issues that the present invention has been made and is now reduced to practice.

SUMMARY

In accordance with a first aspect of the present invention there is provided a method of matching queries in a hybrid infrastructure/infrastructure-less communication network, the network comprising pluralities of first and second type communication devices respectively, the method comprising placing a first query by a user on one of the first type devices and forwarding the query via infrastructure-based communication to one of the second type devices; forwarding, depending on a category of the first query, the first query from the one second type device to one or more first type devices via infrastructure-based communication; and relaying the first query from each of one or more first type devices to one or more neighbouring first type devices via infrastructure-less communication.

The method may further comprise dividing a geographical area covered by the network into a plurality of regions; and wherein the one or more first type devices, to which the first query is forwarded by the second type device, are located in one of the regions.

The method may further comprise forwarding, depending on the category of the first query, the first query from the one second type device to one or more other second type devices.

Each first type device may determine whether a second query matching the first query is available at said first type device.

Each first type device may comprise a notification mechanism to notify users when a match has been determined at a first type device.

Each first type device may store each query that arrives at said first type device.

Each first type device may decide which zero or more queries to delete when a new query arrives at said first type device based on a priority of each query.

Each second type device may determine to which one or more first type devices to forward the first query based on a statistical analysis of a matching time for queries on the one hand, and resource utilisation on the other hand.

The priority of each query may depend one or more different priority factors.

The notification mechanism may comprise sending a notification message to the first type devices from which the respective matching queries originate.

The notification message may be sent by sms or email.

Each first type device may relay a query using only a peer-to-peer connection and not the infrastructure.

The peer-to-peer connection may comprise Bluetooth or Wi-Fi services.

The placing the first query from a user to the one second type device may comprise utilizing direct cellular services of the network.

The forwarding of the first query to the one or more first type devices may comprise utilizing direct cellular services of the network.

The dividing of the geographical area into the regions may be based on one or more of a group consisting of the category of the first query, a popularity of the category of the first query, a density of the first type devices in the network, and a mobility of the first type devices in the network.

The first type devices may be mobile stations of the network.

The first type devices may comprise one or more first sub-type devices capable of infrastructure-less communication, and not capable of infrastructure-based communication.

Said one or more first sub-type devices may inform one or more of the first type devices if a match is determined on said first sub-type device, and said first type device notifies users of the match determined at said first sub-type device.

One or more of the regions are dynamically defined and associated with one or more transport vessels in which a plurality of first type devices are located.

The transport vessels may comprise one or more of a group consisting of a train, a subway train, a plane, and a ship.

The second type devices may be base stations or access points of the network.

In accordance with a second aspect of the present invention there is provided a hybrid infrastructure/infrastructure-less network comprising:

pluralities of first and second type communication devices respectively;

wherein one of the first type devices forwards a first query placed by a user to one of the second type devices;

the one second type device forwards, depending on a category of the first query, the first query to one or more first type devices; and each of the one or more first type devices relays the first query to one or more neighbouring first type devices.

The system may further comprise a geographical area covered by the network and divided into a plurality of regions; and wherein the one or more first type devices, to which the first query is forwarded by the second type device, are located in one of the regions.

The one second type device may forward, depending on the category of the first query, the first query to one or more other second type devices.

In accordance with a third aspect of the present invention there is provided a computer readable data storage medium having stored thereon computer code means for instructing a computer to execute a method of matching queries in a hybrid infrastructure/infrastructure-less network, the network comprising pluralities of first and second type communication devices respectively, the method comprising placing a first query by a user on one of the first type devices and forwarding the query via infrastructure based communication to one of the second type devices; forwarding, depending on a category of the first query, the first query from the one second type device to one or more first type devices via infrastructure based communication; and relaying the first query from each of one or more first type devices to one or more neighbouring first type devices via infrastructure-less communication.

The method may further comprise dividing a geographical area covered by the network into a plurality of regions; and wherein the one or more first type devices, to which the first query is forwarded by the one second type device, are located in one of the regions.

The method may further comprise forwarding, depending on the category of the first query, the first query from the one second type device to one or more other second type devices.

In accordance with a fourth aspect of the present invention there is provided a method of matching queries in a network, the network comprising pluralities of first and second type communication devices respectively, the method comprising dividing a geographical area covered by the network into a plurality of regions; placing a first query by a user on one of the first type devices and forwarding the query to one of the second type devices; forwarding, depending on a category of the first query, the first query from the one second type device to one or more first type devices into one of the regions; and relaying the first query from each of one or more first type devices in the one region to one or more neighbouring first type devices.

In accordance with a fifth aspect of the present invention there is provided a network comprising pluralities of first and second type communication devices respectively; a geographical area covered by the network and divided into a plurality of regions; wherein one of the first type devices forwards a first query placed by a user to one of the second type devices; the one second type device forwards, depending on a category of the first query, the first query to one or more first type devices into one of the regions; and each of the one or more first type devices in the one region relays the first query to one or more neighbouring first type devices.

In accordance with a seventh aspect of the present invention there is provided a computer readable data storage medium having stored thereon computer code means for instructing a computer to execute a method of matching queries in a network, the network comprising pluralities of first and second type communication devices respectively, the method comprising dividing a geographical area covered by the network into a plurality of regions; placing a first query by a user on one of the first type devices and forwarding the query to one of the second type devices; forwarding, depending on a category of the first query, the first query from the one second type device to one or more first type devices into one of the regions; and relaying the first query from each of one or more first type devices in the one region to one or more neighbouring first type devices.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

In an example embodiment, a scenario where a user, who requires some information, places her query on her mobile device is described. This query is then propagated via the infrastructure to a number of randomly chosen users in a specific geographic region. The geographic region depends on the type of query. Within this geographic region, the query then propagates via the peer-to-peer mode as people move around until a match is found (typically on some arbitrary user's mobile device). The user who placed the query is then automatically informed of this match (e.g sms, or email). A system architecture is provided which can be easily deployed at minimal cost over the existing cellular infrastructure. In the example embodiment, the system architecture provides for a distributed geographic database. It is distributed, because information is stored across different people's devices. In other words people are the database. It is a geographic database because, queries related to a particular category are directed to a predetermined geographic region via the infrastructure.

This minimal amount of engineering can result in tremendous improvement in system performance (measured in terms of the time until a match is found). This is quantified by computing a tight theoretical bound on the time until a match is found in the example embodiment. Moreover, the system architecture in the example embodiment provides hooks and handles for giving Quality of Service guarantees to the user.

The system architecture of the example embodiment has a variety of applications. Any application that involves matching queries that complement each other such as bringing buyers and sellers together, dating, etc may be enabled. The example embodiment described is a low cost, scalable alternative to a centralized solution by hosting dedicated servers.

Figure 1:
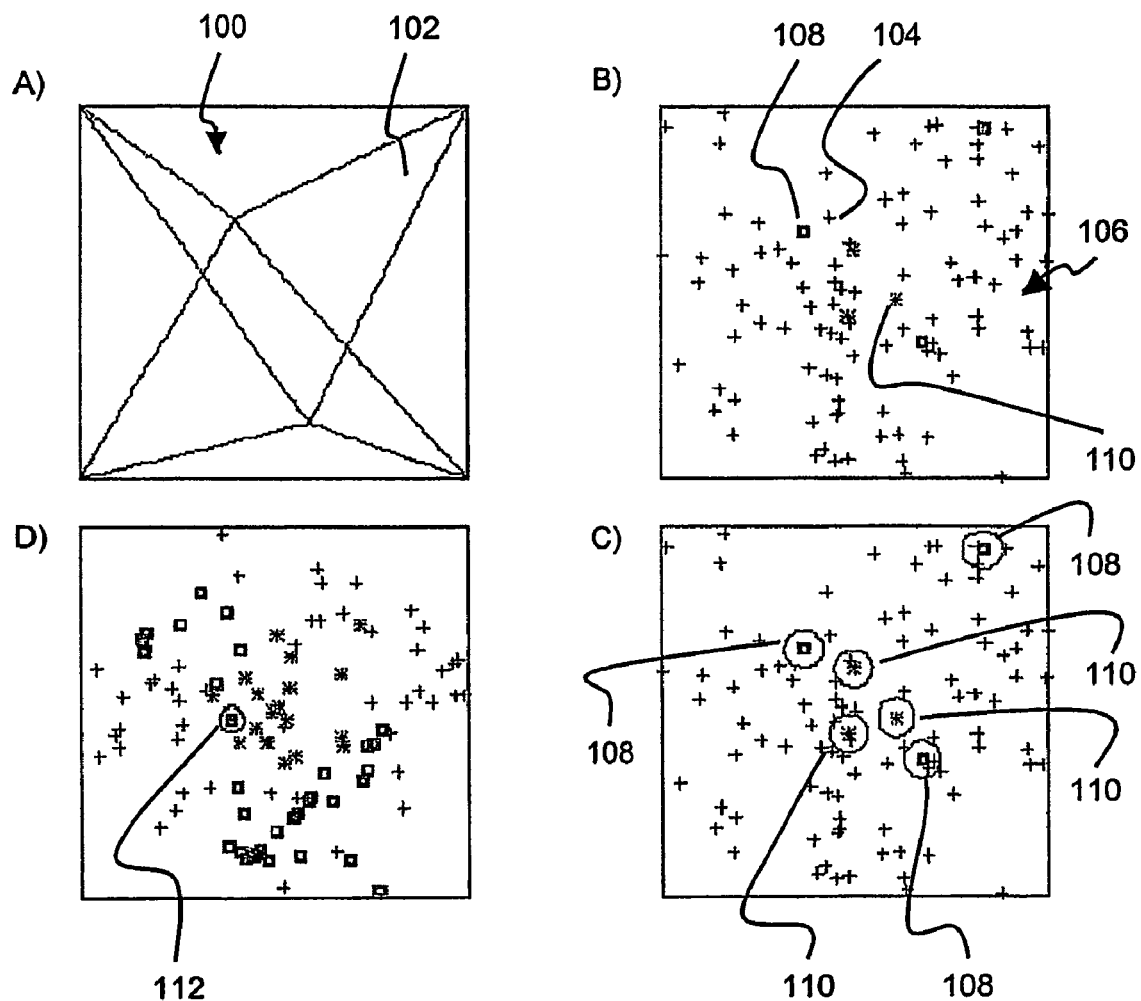
FIG. 1 shows schematic drawings A-D illustrating the architecture of a wireless virtual social network in accordance with an embodiment of the present invention.

As shown in drawing A of FIG. 1, in the example embodiment, a city 100 is divided into a number of regions e.g. 102, which are referred to as bazaars. A bazaar can span a few cells of e.g. a cellular network. Each bazaar e.g. 102 is dedicated to serve queries that belong to certain categories (e.g. sports and entertainment). When a user places a query on her device (say a query relating to sports), the query is propagated via the cellular infrastructure to the base stations within a bazaar e.g. 102. The base stations then select k users at random and propagate the queries to them. As these k users move around, they propagate the query to other users, who in turn further propagate the query via the peer-to-peer mode. In the example embodiment, the category "assigned" to individual bazaars may be arbitrary. In other words, a bazaar becomes a preferred resource for queries in a particular category simply due to the fact that all queries of that category will be directed into that bazaar, thereby achieving a high concentration of such queries and increasing the likelihood of matching queries within the bazaar. This is notwithstanding that the ultimate matched queries may originate from anywhere, i.e. including from within the bazaar or from outside of the bazaar.

In different embodiments, the assignment of categories to the bazaars may alternatively or additionally be based on other parameters, including certain characteristics of the geographic region of a bazaar. For example, the presence of a large number of car retailers may lead to an assignment of queries in a "car sales" category been to that particular bazaar.

In different embodiments, bazaars may alternatively be defined with reference to other regions into which the queries may be distributed and which potentially contain a concentration of mobile devices, such as for example trains including subway trains, planes, ships, or other transport vessels. In such embodiments, the region associated with such a bazaar may be dynamically defined within the overall network.

Drawings B-D of FIG. 1 illustrate this basic system architecture in the example embodiment. When two matching queries are co-located on a single device, the device automatically informs the respective users about the match via the network infrastructure. For example this could be achieved by sending an sms message to the users who initially placed the queries. When a user places a query on her device (say a query relating to sports), the query is propagated via the infrastructure to k random users in the sports bazaar. As these k users move around, they propagate the query to other users, who in turn further propagate the query via the peer-to-peer mode.

In drawing B of FIG. 1, the crosses e.g. 104 represent the users in a bazaar e.g. 102. The squares e.g. 108 and asterisks e.g. 110 represent two matching queries which have each been placed on three users in the bazaar 106. In drawing C of FIG. 1, it is shown how these queries e.g. 108, 110 get propagated via the peer-to-peer mode. Finally, in drawing D of FIG. 1 a match occurs when both queries are located on the same device 112. When two matching queries are co-located on the same device 112, the device 112 automatically informs the users who placed the queries that a match has occurred. This is done by using the network infrastructure.

It is noted that some of the devices may not be capable of communicating using the network infrastructure, but are capable of communicating with other devices using infrastructure-less communication. Such devices can still participate in the implementation of example embodiments, and perform the matching and infrastructure-less relaying. In one example embodiment, where a match is identified on one of such devices not capable of communicating using the network infrastructure, that device could, when they are in the vicinity of another device capable of communicating using the network infrastructure, inform that other device of the match. The other device capable of communicating using the network infrastructure can than notify the respective parties about the match using the network infrastructure.

In the following, some of the design issues associated with the architecture in the example embodiment are described. The intuition behind the architecture is that the expected matching time between two queries is proportional to the expected initial distance between them. Therefore, by partitioning e.g. a city into bazaars each serving queries of a certain category one is actually able to decrease the initial minimum distance between matching queries. Moreover, sending k copies of each query achieves two purposes. First, it ensures that each query lasts in the system for a longer duration. This ensures that even if a matching query arrives at a later time, there is a good chance of a match. Second, the minimum distance between matching queries, reduces sharply as k increases, thereby ensuring a rapid time to match.

Bazaar Planning:

Creating bazaars can speed up the dynamics of the matching of queries by reducing the average initial distance between matching queries. Queries that start off geographically closer have a higher chance of finding each other than those that start off further apart. Since the initial distance between matching queries is bounded by the size of the bazaar, it allows to provide probabilistic bounds on the time to a match. In other words, the bazaar concept allows intelligent engineering of the system to seek to provide Quality of Service(QoS) guarantees.

One can view bazaar planning as a resource allocation problem. For example, the size of a bazaar for a particular category should depend on the number of possible queries in a particular category and its popularity. In other words, if a query category is more popular, one might designate a larger sized bazaar for it. If one assumes population density is constant, then from the point of view of resource allocation, we might allocate more resources (i.e more memory) to more popular categories. Bazaar planning may also depend on mobility patterns. If the users in a particular region are highly mobile, then one would like to assign a larger bazaar size to this region. This is because one would like users in a particular bazaar to remain in it for a sufficiently long period of time to ensure a match.

Figure 2:
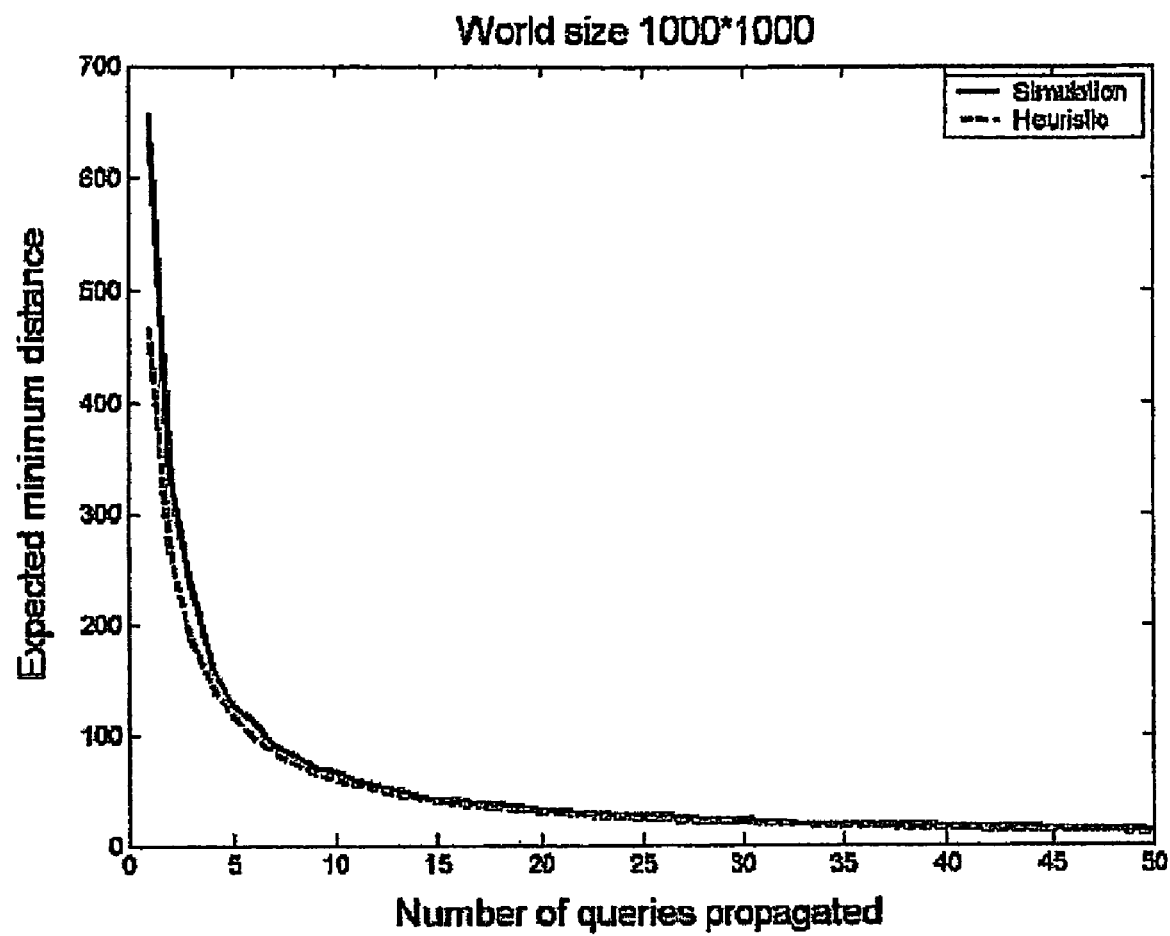
FIG. 2 shows a plot illustrating the minimum distance between two types of queries as a function of number of queries propagated, in accordance with an example embodiment.

Number of Queries to Propagate:

By placing k copies of the query at random in the example embodiment one drastically decreases the minimum distance $P_0$ between matching queries. In FIG. 2 a plot for how the minimum distance between two types of queries decreases as k increases is shown. It can be seen that the decrease is super linear. Intuitively, one sees that if there are N users in a bazaar, then the probability of a match at time zero may be given by $$P_o = \frac{\binom{N-k}{k}}{\binom{N}{k}} \le \left(1 - \frac{k}{N}\right)k$$

Therefore, since $P_0$ decreases rapidly as k increases, one expects that the time for a match also rapidly decreases. This simple analysis also implies that if there are multiple matches for the same query, then because of the bazaar concept, the matching time will be extremely small. A solution would be to distribute each query to every user in a bazaar. However, this is not only expensive, but also utilizes too much of the system resource. In this context, the system resources include the capacity of the infrastructure, the buffers and the energy of the individual nodes.

For example, if the infrastructure is cellular, then transmitting every query to every user in a bazaar will utilize a lot of bandwidth and could overwhelm the system. However, from the analysis above and FIG. 2 the inventors have recognised that beyond a certain value of k, the decrease in matching time is marginal. More importantly, the value of k at which this occurs is quite small. In other words, by using a small part of the system resources, one can achieve good performance in terms of matching time. Moreover, since queries arrive at random times to the system, if each query is transmitted to a large number of users, then from an individual user's perspective, the arrival rate of queries is large, which means that the rate at which queries are flushed out is also larger. Therefore, this should decrease the time spent by a query in the system and consequently the probability of match.

Buffer Management:

In the architecture of the example embodiment a node does not know whether a query it possesses has already been matched or not. This may result in a unnecessary use of resources, both in terms of memory (for storing already matched queries) and energy in transmitting redundant queries. The design of clever buffer management algorithms in different example embodiments can alleviate this. One mechanism would be to have a Time To Live (TTL) stamp on each query and delete every query when the current time is greater than the TTL. Essentially the buffer management algorithm has two tasks. First, whenever it receives a query from either the system or from a neighboring node, it must decide which query it has to erase from its memory to accommodate the new query. There are several candidate algorithms, such as First-in-First-out (FIFO) or Oldest Query First, which are possible. Similarly, when a node has a neighbor, it has to decide on which query to relay to its neighbor. In a preferred embodiment, buffer management policies which maximizes the matching probability while minimizing the matching time are implemented.

System Capacity:

The discussion above about buffer management strategies also points to a notion of system capacity. Let $\mu$ denote the average inter-arrival time between matching queries and let $\lambda$ denote the average inter-arrival rate of queries into the system. Assuming that there exists a buffer management policy which maximizes the matching probability, then one can define the capacity region of this system to be the set of tuples $(\mu,\lambda)$, for which there exists some buffer management policy which should almost guarantee a match.

System Security:

Security can be an important aspect of implementations of systems and networks based on the example embodiment. Some simple encryption mechanisms may provide a degree of security. However, it will be appreciated that other mechanism may be employed to enhance security in different embodiments.

Quality of Service:

For example, one can assign a higher priority to a query, which will mean that (i) the query is propagated to a larger number of users, (ii) the query has least chance of being deleted and (iii) the query has a higher chance of being relayed to a neighboring node.

Figure 3:
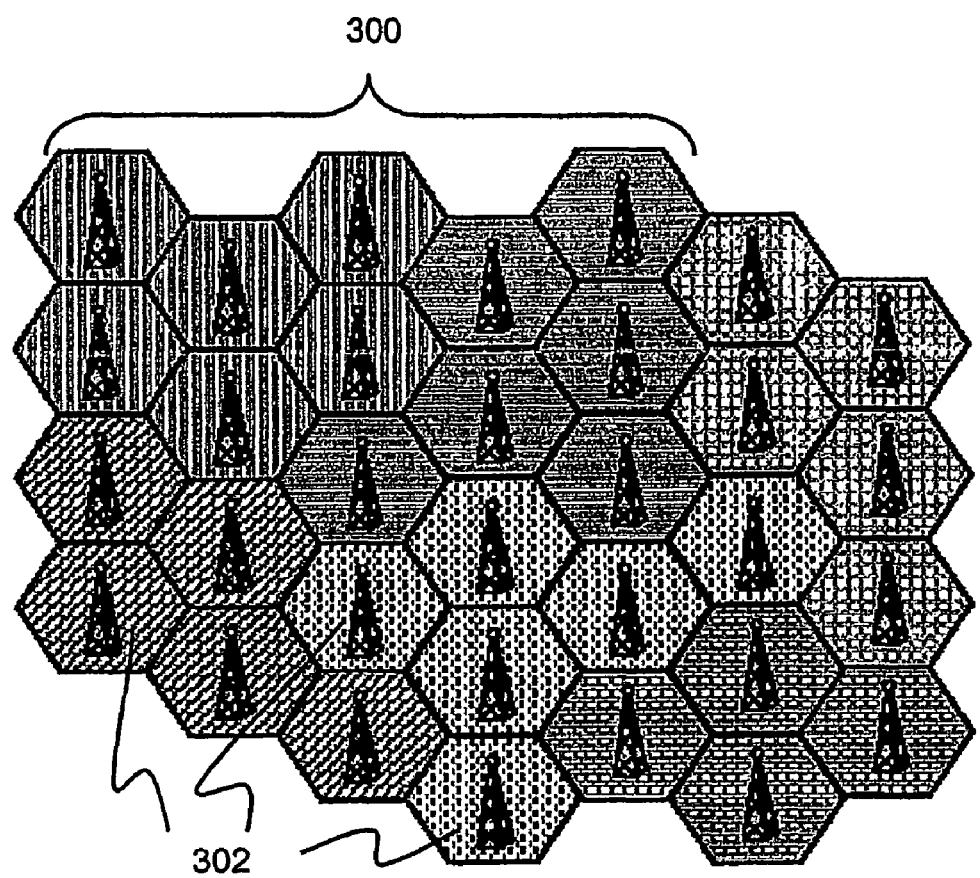
FIG. 3 is a schematic drawing illustrating bazaars as an overlay to an existing cellular infrastructure, in accordance with an example embodiment.

The example embodiment described above may be integrated into various types of systems (e.g. cellular, WAN etc.). In the following, it is described how the architecture can be integrated with existing cellular networks. First, bazaar planning can be done on top of cellular planning. Therefore a bazaar could be the area spanned by a few cells which are controlled by a single Mobile Switching Center (MSC). FIG. 3 depicts bazaars e.g. 300 as an overlay network on an existing cellular infrastructure 302.

When a user places a query, it is directed to the MSC, which uses a look up table to route the query to the MSC which is in charge of the bazaar e.g. 302 corresponding to the query. When an MSC receives a query from another MSC, it chooses k random users from its Visitor Location Register (VLR) and directs the query to these k users. If a device detects a match between two queries (say query q and r), it automatically forwards the address of r to q and vice versa. This could either be an sms or an email. It will be appreciated that in different network implementations, the MSCs may be replaced by other devices such as base stations in the form of serving General Packet Radio Service Support Nodes (SGSNs), Gateway GPRS Support Nodes (GGSNs), and access points of the network.

Figure 4:
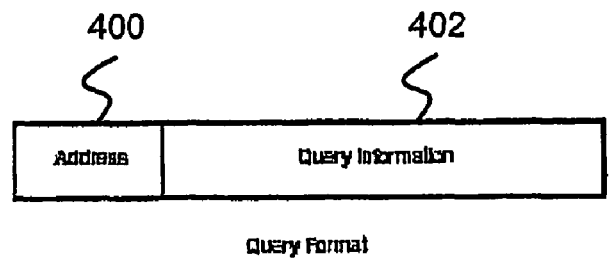
FIG. 4 is a schematic drawing illustrating a query format, according to an example embodiment.

The format of each query in the example embodiment is shown in FIG. 4. Each query consists of an address field 400 and a query field 402. The address field 400 could be a phone number or an email address. The example embodiment can be implemented on top of any existing cellular infrastructure with minimal additions and complexity. It is noted that the example embodiment may alternatively be implemented as a new network, built from the ground up, although that would mean installing a minimal infrastructure to support the operation.

Figure 5:
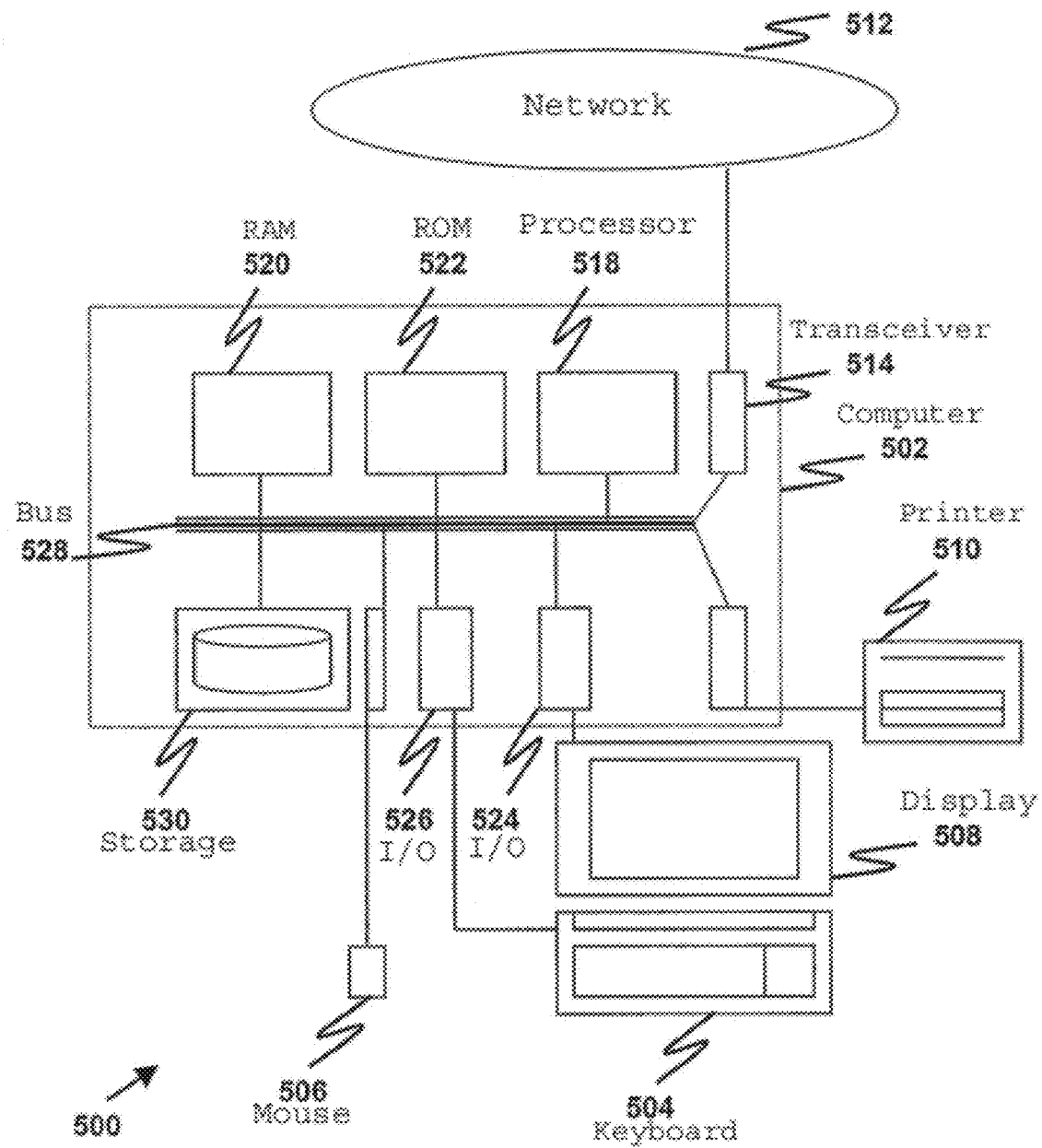
FIG. 5 shows is a schematic drawings illustrating a computer system for implementing a method and system according to an example embodiment.

The method and system of the example embodiment can be implemented on a computer system 500, schematically shown in FIG. 5. It may be implemented as software, such as a computer program being executed within the computer system 500, and instructing the computer system 500 to conduct the method of the example embodiment.

The computer system 500 comprises a computer module 502, input modules such as a keyboard 504 and mouse 506 and a plurality of output devices such as a display 508, and printer 510.

The computer module 502 is connected to a computer network 512 via a suitable transceiver device 514, to enable access to e.g. the Internet or other network systems such as Local Area Network (LAN) or Wide Area Network (WAN).

The computer module 502 in the example includes a processor 518, a Random Access Memory (RAM) 520 and a Read Only Memory (ROM) 522. The computer module 502 also includes a number of Input/Output (I/O) interfaces, for example I/O interface 524 to the display 508, and I/O interface 526 to the keyboard 504.

The components of the computer module 502 typically communicate via an interconnected bus 528 and in a manner known to the person skilled in the relevant art.

The application program is typically supplied to the user of the computer system 500 encoded on a data storage medium such as a CD-ROM or floppy disk and read utilising a corresponding data storage medium drive of a data storage device 530. The application program is read and controlled in its execution by the processor 518. Intermediate storage of program data may be accomplished using RAM 520.

Figure 6:
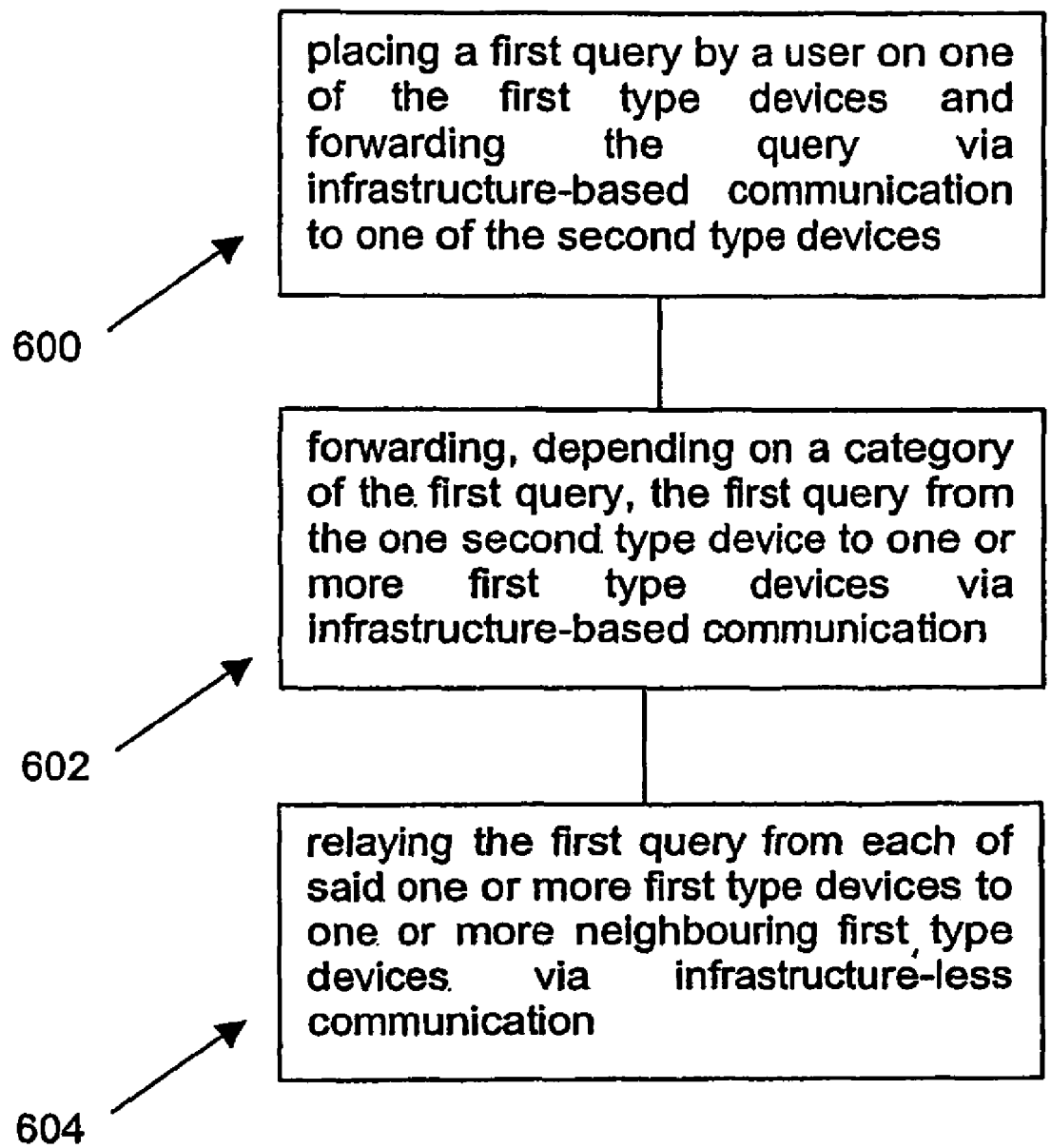
FIG. 6 shows a flowchart illustrating a method according to an example embodiment.

FIG. 6 shows a flowchart illustrating a method of matching queries in a hybrid infrastructure/infrastructure-less communication network, the network comprising pluralities of first and second type communication devices respectively, in an example embodiment. At step 600, a first query is placed by a user on one of the first type devices and the query is forwarded via infrastructure-based communication to one of the second type devices. At step 602, depending on a category of the first query, the first query is forwarded from the one second type device to one or more first type devices via infrastructure-based communication. At step 604, the first query is relayed from each of said one or more first type devices to one or more neighbouring first type devices via infrastructure-less communication.

Figure 7:
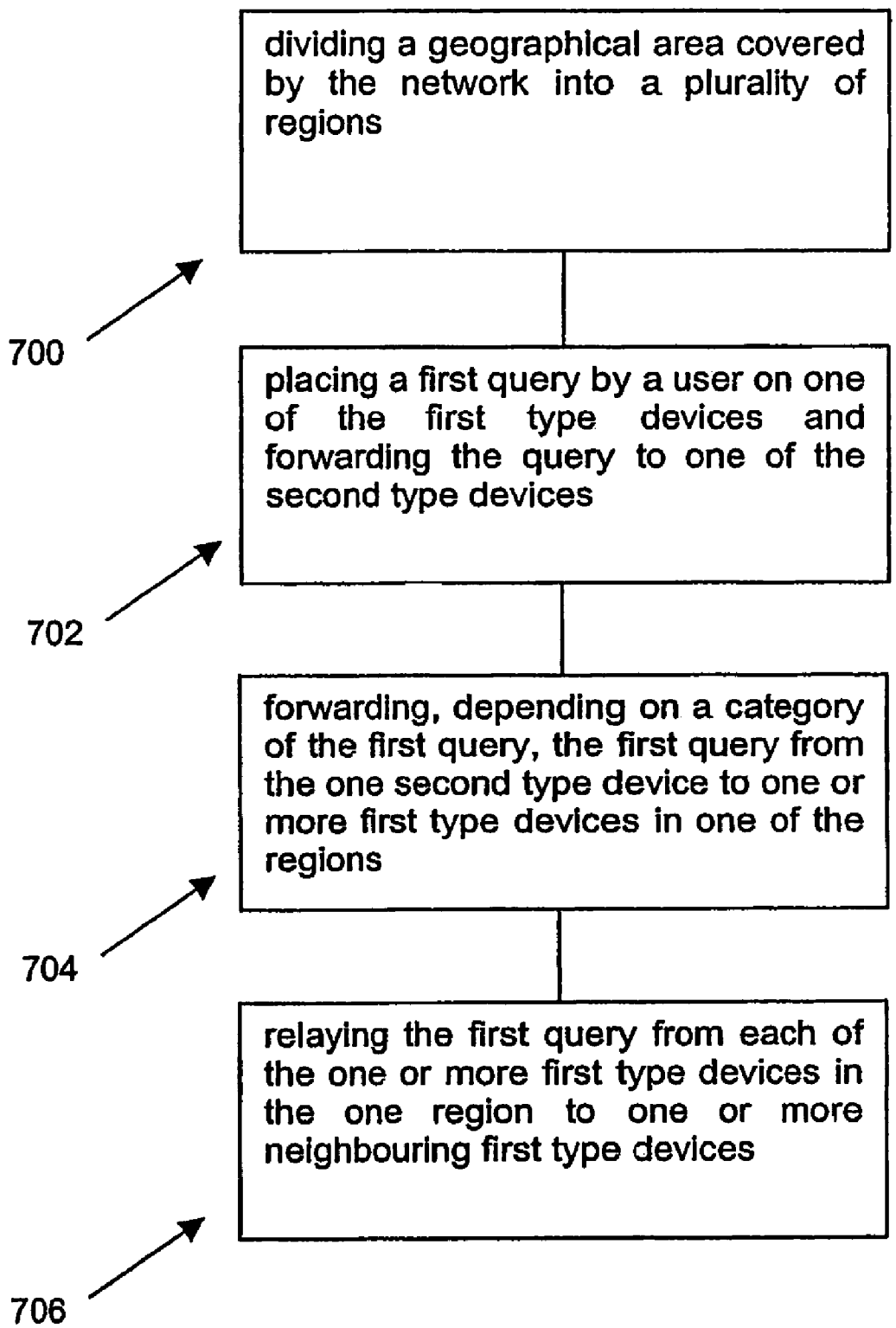
FIG. 7 shows a flowchart illustrating a method according to an example embodiment.

FIG. 7 shows a flowchart illustrating a method of matching queries in a network, the network comprising pluralities of first and second type communication devices respectively, in another example embodiment. At step 700, a geographical area covered by the network is divided into a plurality of regions. At step 702, a first query is placed by a user on one of the first type devices and the query is forwarded to one of the second type devices. At step 704, depending on a category of the first query, the first query is forwarded from the one second type device to one or more first type devices in one of the regions. At step 706, the first query is relayed from each of the one or more first type devices in the one region to one or more neighbouring first type devices.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The example embodiment allows users to give meaning to the queries that they propagate, through selective computing and forwarding.

The example embodiment incorporates the ideas of using the infrastructure to spread to an initial number of users in a common geographical area, known as a bazaar to improve the performance of information access. This also enables the embodiment to be engineered intelligently through setting design parameters and utilizing smart algorithms.

The example embodiment does not require the existence of a "wired network", although it may support the activities of SWIM. Rather, the example embodiment exploits the existing distributed database residing in people by constructing a virtual wireless social network. The distribution in the example embodiment may be regarded as a branching random process, rather than a simple random walk.

The invention claimed is:

1. A method, comprising:
   receiving a query, based on a category of the query and a geographic area assigned to the category, from a first communication device of a first type by a communication device of a second type communicatively coupled to the first communication device via a network infrastructure, wherein the communication device of the second type is located within the geographic area assigned to the category;
   selecting, by the communication device of the second type, at least one second communication device of the first type from a plurality of communication devices of the first type that is at least temporarily located within the geographic area; and
   forwarding, by the communication device of the second type, the query to the selected at least one second communication device via the network infrastructure,
   wherein the query is respectively forwarded to the selected at least one second communication device to relay the query to at least one third communication device of the first type that is at least temporarily neighboring and communicatively coupled with the selected at least one second communication device.

2. The method as claimed in claim 1, wherein said receiving comprises receiving the query, by the communication device of the second type, via cellular services.

3. The method as claimed in claim 1, further comprising forwarding the query to one or more additional communication devices of the second type, based at least in part on the category of the query, by the communication device of the second type.

4. The method as claimed in claim 1, wherein said selecting is based at least in part on a statistical analysis of a matching time for queries and probability of a match.

5. The method as claimed in claim 1, wherein the communication device of the second type is a base station or an access point of the network infrastructure.

6. The method of claim 1, wherein said selecting further comprises randomly selecting the at least one second communication device of the first type from the plurality of communication devices of the first type.

7. The method of claim 1, wherein the first communication device, the at least second communication device, and the at least one third communication device of the first type include mobile communication devices, and wherein the communication device of the second type includes a stationary communication device.

8. The method of claim 1, wherein the first communication device, the at least one second communication device, and the at least one third communication device include communication devices configured to originate queries, and wherein the communication device of the second type includes a communication device configured to forward queries.

9. The method of claim 1, wherein the geographic area assigned to the category associated with the query is arbitrarily assigned.

10. The method of claim 1, wherein the geographic area assigned to the category associated with the query is based on characteristics of the geographic area.

11. The method of claim 1, wherein the geographic area assigned to the category associated with the query is dynamically defined.

12. The method of claim 1, wherein the query is respectively forwarded to the selected at least one third communication device to relay the query to at least one fourth communication device of the first type via one or more peer-to-peer connections separate and distinct from the network infrastructure.

13. A method, comprising:
    receiving a first query associated with a category having a geographic area assigned to the category, by a first communication device of a first type, from a communication device of a second type communicatively coupled to the first communication device via a network infrastructure,
    wherein the first query is originated from a second communication device of the first type located outside the geographic area, and the first query is forwarded from the second communication device of the first type to the communication device of the second type based on the category of the query and the geographic area assigned to the category,
    wherein the communication device of the second type is located within the geographic area assigned to the category, and
    wherein the first communication device is at least temporarily located within the geographic area;
    determining, by the first communication device, whether a second query that complements the first query has been received at the first communication device; and
    based on said determining, relaying, via one or more peer-to-peer connections separate and distinct from the network infrastructure, the first query from the first communication device to at least one third communication device of the first type that is at least temporarily neighboring the first communication device.

14. The method as claimed in claim 13, further comprising generating, by the first communication device, a notification message in response to a determination that the second query that complements the first query has been received.

15. The method as claimed in claim 14, further comprising transmitting, via the network infrastructure, by the first communication device, the notification message to the second communication device of the first type from which the first query or the matching second query originated.

16. The method as claimed in claim 14, wherein the notification message includes a Small Message Service (SMS) message or an Email.

17. The method as claimed in claim 13, further comprising storing, by the first communication device, the first query.

18. The method as claimed in claim 17, further comprising determining, by the first communication device, whether one or more previously stored queries are to be deleted from the first communication device, based at least in part on relative priorities of the one or more previously stored queries.

19. The method as claimed in claim 13, wherein the first communication device is a mobile station of the network infrastructure.

20. The method as claimed in claim 13, wherein the at least one third communication device that is at least temporarily neighboring the first communication device is capable of infrastructure-less communication, and incapable of infrastructure-based communication.

21. The method of claim 13, wherein said relaying further comprises relaying the first query to the at least one third communication device while the first communication device is moving about in the geographic area.

22. A non-transitory computer-readable storage medium comprising a plurality of instructions stored thereon that are configured to cause an apparatus, in response to execution of the instructions by the apparatus, to perform operations including:
- receiving a query, based on a category of the query and a geographic area assigned to the category, from a first communication device of a first type communicatively coupled to the apparatus via a network infrastructure, wherein the apparatus is located within the geographic area assigned to the category;
- selecting at least one second communication device of the first type from a plurality of communication devices of the first type that is at least temporarily located within the geographic area; and
- forwarding the query to the selected at least one second communication device, via the network infrastructure, wherein the query is respectively forwarded to the selected at least one second communication device to relay the query to at least one third communication device of the first type that is at least temporarily neighboring and communicatively coupled with the selected at least one second communication device, and
- wherein the apparatus is a communication device of a second type.

23. The non-transitory computer-readable storage medium of claim 22, wherein the query is respectively forwarded to the selected at least one third communication device to relay the query to at least one fourth communication device of the first type via one or more peer-to-peer connections separate and distinct from the network infrastructure.

24. A non-transitory computer-readable storage medium, comprising a plurality of instructions stored thereon that are configured to cause a first communication device of a first type, in response to execution of the instruction by the first communication device of the first type, to perform operations including:
- receiving a first query associated with a category having a geographic area assigned to the category, via a network infrastructure, from a communication device of a second type communicatively coupled to the first communication device via the network infrastructure,
- wherein the first query is originated from a second communication device of the first type located outside the geographic area, and the first query is forwarded from the second communication device of the first type to the communication device of the second type based on the category of the query and the geographic area assigned to the category,
- wherein the communication device of the second type is located within the geographic area assigned to the category, and
- wherein the first communication device is at least temporarily located within the geographic area;
- determining whether a second query that complements the first query has been received by the first communication device; and
- based on said determining, relaying the first query, via one or more peer-to-peer communications separate and distinct from the network infrastructure, to at least one third communication device of the first type that is at least temporarily neighboring the first communication device.

* * * * *